United States Patent
Saha et al.

(10) Patent No.: US 7,366,831 B2
(45) Date of Patent: Apr. 29, 2008

(54) LOCK-FREE BOUNDED FIFO QUEUE MECHANISM

(75) Inventors: Bratin Saha, San Jose, CA (US); Ali-Reza Adi-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 11/241,225

(22) Filed: Sep. 30, 2005

(65) Prior Publication Data

US 2007/0079071 A1    Apr. 5, 2007

(51) Int. Cl.
*G06F 12/00* (2006.01)
(52) U.S. Cl. .................................... 711/110
(58) Field of Classification Search ............ 711/118, 711/110; 710/52
See application file for complete search history.

(56) References Cited

U.S. PATENT DOCUMENTS

| | | | | |
|---|---|---|---|---|
| 6,178,473 | B1* | 1/2001 | Bonola | 710/54 |
| 6,697,927 | B2* | 2/2004 | Bonola | 711/168 |
| 6,889,269 | B2* | 5/2005 | Forin et al. | 710/54 |

* cited by examiner

*Primary Examiner*—Hiep T. Nguyen
(74) *Attorney, Agent, or Firm*—Blakely, Sokoloff, Taylor & Zafman LLP (57) ABSTRACT

A system includes a processor and a size bounded first-in first-out (FIFO) memory that is connected to the processor and a display is connected to the processor. A managing process to run on the processor to manage the FIFO memory structure. The FIFO memory includes a counter portion and a value portion for each of a tail portion and a head portion, and the managing process is non-blocking. The counter portion is used as a timestamp to maintain FIFO order.

22 Claims, 6 Drawing Sheets

```
typedef struct {
        volatile uint64 head;  /* head of the queue, dequeueing happens at the
head */
        volatile uint64 tail;   /* tail of the queue, enqueueing happens at the tail */
        uint32 size;         /* size of the queue */
        volatile uint64* dataValues;
}McrtNonBlockingBoundedQueue;
```

FIG. 1

```
uint16 mcrtNonBlockingBoundedQueueDequeu(McrtNonBlockingBoundedQueue* queue)
{
        uint64 tail, head, dataCounter, oldValue, newValue;
        uint32 size = queue->size;
        do {
                head=queue->head;
                tail=queue->tail;
                if(tail == head) {
                        /* empty, return the invalid value */
                        return McrtNonBlockingBoundedQueueInvalidValue;
                }
                /* non empty queue */
                oldValue = queue->data[head % size];
                /* the lower 16 bits store the data value */
                if (oldValue:16 == McrtNonBlockingBoundedQueueInvalidValue) (
                        /* either empty or the head needs to be adjusted. We already check for
                        emptiness before getting here. the tail can only be incremented, so the
                        queue can not be empty at the given value of head
                        */
                        CAS64(&(queue->head), head, head+1);
                        continue; /* try the loop again for dequeuing */
                }
                /* there is a valid data item in this slot */
                /* which dequeue operation is supposed to remove this data item
                * this helps in maintaining FIFO ordering. The dataCounter essentially gives the
timestamp
                * when the item was enqueued
                */
                if (oldValue:48 == head) (/* check the timestamp */
                        /* this value is next in line to be dequeued, no one took it out yet
                        0xFFFF is the invalid value. newValues is what we want to stick in after a
successful
                        dequeue
                        */
                        newValue = (head + size) :: 0xFFFF
                        if(CAS64(&(queue->data[head % size]), oldValue, newValue)) |
                                /* got it */
                                break;
                        }
                }
        } while (1);
        /* try to adjust the head and return. We don't need to check for anything here becuase if
        the CAS does not succeed it means someone else adjusted the head
        */
        CAS64(&(queue->head), head, head + 1);
        return oldValue:16;
}
```

(dequeing)

FIG. 2

```
Bool mcrtNonBlockingBoundedQueueEnqueue(McrtNonBlockingBoundedQueue* queue, uint16 value)
{
        uint64 tail, head;
        uint64 tempValue, newValue;
        uint16 data;
        uint32 size = queue->size;
        do {
                tail = queue->tail;
                head = queue->head;
            if (tail >= head + size)
               return False; /* means queue is full*/

/* there is space in the queue */
                data = (queue->data[tail % size]):16;  /* read the data value at the tail of queue
*/
                if (data != McrtNonBlockingBoundedQueueInvalidValue) {
                        /* either it is full or the tail needs to be adjusted. it cannot be
                        full at the current value of tail, because we just tested it, and head
                        can only get incremented. so it must be the case that tail needs
                        adjusting
                        */
                        CAS64(&(queue->tail), tail, tail+1);
                        continue ; /* try the loop again for inserting */
                }
                /* this data slot is now empty */
        /* 0xFFFF is the invalid value. It indicates that the slot is empty. tempValue is what
we will
                compare with in the CAS when we do the atomic insertion of the value
                */
                tempValue = tail :: 0xFFFF;
                newValue = tail :: value;
                /* newValue is the 64 bit entity that we want to put into the slot
                   value is the value to be enqueued
                tail specifies which dequeue operation should dequeue this value
                        essentially it is a timestamp that helps in maintaining FIFO ordering
                */
                if (CAS64(&(queue->data[tail % size]), tempValue, newValue)) [
                        /* succeeded in enqueing the value, get to adjusted the tail */
                        break;
                }
        } while (1);
        /* try to adjust the tail. We don't need to test the result here. If the CAS fails that means
another thread
        adjusted the tail for us
        */
        CAS64(&(queue->tail), tail, tail + 1);
        return True;
}
                                         (enqueing)
```

LOCK-FREE BOUNDED FIFO QUEUE MECHANISM

BACKGROUND

1. Field

The embodiments relate to managing queue memory structures, and more particularly to unblocked and lock-free adding and removing data structures to a queue memory structure.

2. Description of the Related Art

Many devices and systems today use queue structures for managing data structures. Most existing concurrent implementations place restrictions on managing queue structures, such as single enqueuer, dequeuer, etc. Many existing concurrent queue implementations allow concurrent enqueues and dequeues, but require using some form of Oracle® algorithms to find a head and tail of the queue structure. These algorithms are usually linear with respect to the size of the queue structure. Many of the queue structures used are unbounded. With this structure, the first-in-first-out order is established by a linked-list nature of the queue.

BRIEF DESCRIPTION OF THE DRAWINGS

The embodiments are illustrated by way of example, and not by way of limitation, in the figures of the accompanying drawings and in which like reference numerals refer to similar elements and in which:

FIG. 2 illustrates an embodiment for a coded dequeueing instruction.

FIG. 3 illustrates an embodiment for a coded enqueueing instruction.

DETAILED DESCRIPTION

The embodiments discussed herein generally relate to unblocked and lock-free adding (e.g., enqueueing) and removing (dequeueing) data structures to a queue memory structure. Referring to the figures, exemplary embodiments will now be described. The exemplary embodiments are provided to illustrate the embodiments and should not be construed as limiting the scope of the embodiments.

Figure 1:
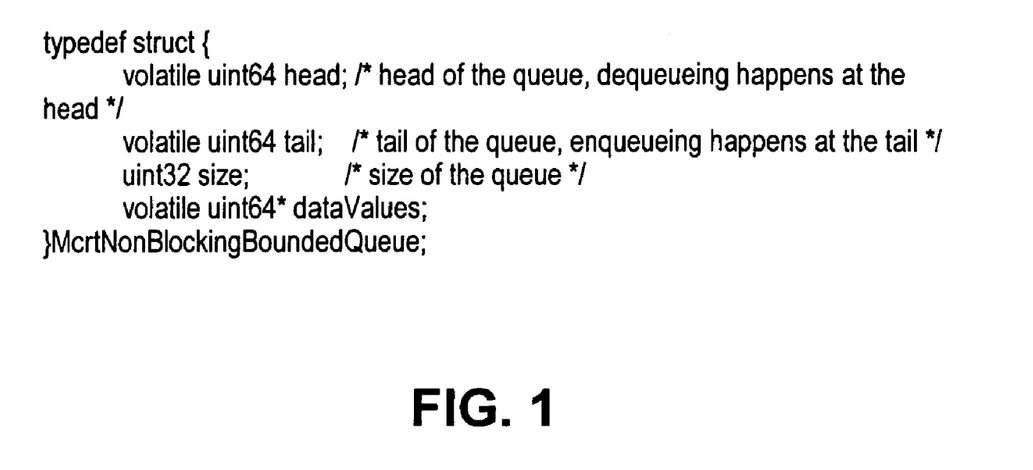
FIG. 1 illustrates an embodiment for a queue structure.

FIG. 1 illustrates an embodiment for a bounded first-in-first-out (FIFO) memory structure, such as a queue structure, including a plurality of data structures, that is managed by a managing process (e.g., a queue managing process). The memory structure has a head portion and a tail portion (dequeueing/removing occurs at the head portion, and enqueueing/adding occurs at the tail portion). The size field is filled in during initialization by the managing process. The element "dataValues" is a pointer to a memory structure (e.g., a queue array) that contains a plurality of data values. In one embodiment each memory location includes a 64 bit quantity, where 48 bits are used as a counter portion, and 16 bits are used to store a value. In this embodiment, the bounded memory structure can store 16 bit quantities. It should be noted that in certain processing devices, such as a Intel® Extended Memory 64 Technology (EM64T) machine, 64 bit values can be stored into a queue structure (by using a 128 bit compare and exchange (CMPXCHG) instruction). The CMPXCHG instruction compares its destination (first) operand to the value in an accumulator (e.g., AL, AX or EAX; depending on the size of the instruction). If compared values are equal, the CMPXCG instruction copies its source (second) operand into the destination and sets a zero flag. Otherwise, the CMPXCHG instruction clears the zero flag and leaves the destination alone.

In one embodiment the managing process enqueues new elements at the tail portion, and dequeues elements from the head portion. When an element is dequeued, in one embodiment the value of 0xFFFF (i.e., invalid value) is inserted in the head portion so that during enqueue, it is known that the memory location is empty. In one embodiment the memory location has a queue→tail field and a queue→head field. In one embodiment the queue→tail field and the queue→head field always get incremented. Since these memory locations include 64 bit values, these values will not overflow. In this embodiment, since the data array is bounded, the values of head (and tail) modulus the size is used to index into the queue. In this embodiment, by using 64 bit head portion/tail portion with masking, it is easily determined whether the memory structure is full or empty since there is no wrap-around of the head portion and tail portion values.

In one embodiment the managing process maintains that enqueueing instructions insert a new value into a memory location only if the memory location contains the invalid value 0xFFFF. In one embodiment enqueueing includes two operations. The first operation adds the new value into the memory structure (e.g., queue array). The second operation updates the tail portion. In this embodiment there is a window of time between these two operations. Due to the enqueueing instruction, in one embodiment a thread can recognize if another thread is executing in this window of time. That is, another thread has added a new value, but not yet updated the tail portion. In one embodiment concurrent enqueue instructions can wait for the tail portion to be adjusted, or the enqueue instructions can adjust the tail portion themselves since the instructions will be able to determine that the tail portion needs to be incremented (e.g., by a value of one). In this embodiment, the managing process is non-blocking for concurrent enqueue instructions/operations.

In one embodiment, the managing process includes dequeue instructions that dequeue from a memory location if the memory location does not contain the invalid value 0xFFFF, and then inserts the invalid value 0xFFFF after dequeueing. In one embodiment dequeueing instructions include two operations. The first operation removes the old value and inserts the invalid value 0xFFFF (e.g., using a single atomic compare and exchange instruction). The second operation adjusts the head portion. In this embodiment a window of time exists between these two operations where some other thread may want to perform a dequeue instruction. In one embodiment concurrent dequeueing instructions can determine when another thread are executing in the window time, and these can either wait for the operation to complete or help by adjusting the head portion itself. In this embodiment, the managing process is non-blocking for concurrent dequeue instructions/operations.

In one embodiment, the management process uses the counter portions for time stamping in the enqueue and dequeue instructions to track FIFO ordering. In one embodiment, since the memory structure uses a 64 bit head portion and tail portion indices, the value of the tail portion when an item is being enqueued reflects the order of the item in the memory structure. That is (tail portion location—one). Dequeue operations are completed before the next dequeueing operation for a newly inserted item. In one embodiment the value in the location queue→tail is stored along with the inserted item, and it is used during a dequeue operation to ensure that items are taken out in FIFO order.

FIG. 2 illustrates an embodiment of a code sequence for a dequeue instruction. As illustrated in FIG. 2 (and FIG. 3), the "%" character is used to denote a modulus operation; the "::" symbol is used to denote the append operation; that is a::b denotes the entity obtained by concatenating the two pieces together. In this embodiment, a CAS64 instruction is used as a wrapper around locked cmpxchg8b instruction (the compare and exchange instruction over 64 bits in the IA-32× 86 instruction set architecture (ISA)). The CAS64 instruction atomically compares a 64 bit value with a 64 bit memory location. If the compared values are equal, the instruction inserts a new 64 bit value into the memory location, and returns a "True" status. Otherwise, the instruction leaves the memory location unchanged, and returns a "False" status. In one embodiment, if a timestamp associated with the head portion matches a current timestamp, the dequeue instruction removes a data structure from the head portion and inserts an invalid value into the head portion.

FIG. 3 illustrates an embodiment of a code sequence for an enqueue instruction. In this embodiment, if the memory structure is full, the enqueue instruction returns a "False" status, else the instruction returns a "True" status. In this embodiment, the parameter 'value' is the element to enqueue.

In one embodiment, the managing process performs enqueueing/adding and dequeueing/removing instructions concurrently. In one embodiment, the enqueueing/adding instruction and the dequeueing/removing instruction each include a single compare and swap instruction. In one embodiment a value equal to either the tail portion or the head portion modulus a size of the FIFO memory structure is used to index the FIFO memory structure.

Figure 4:
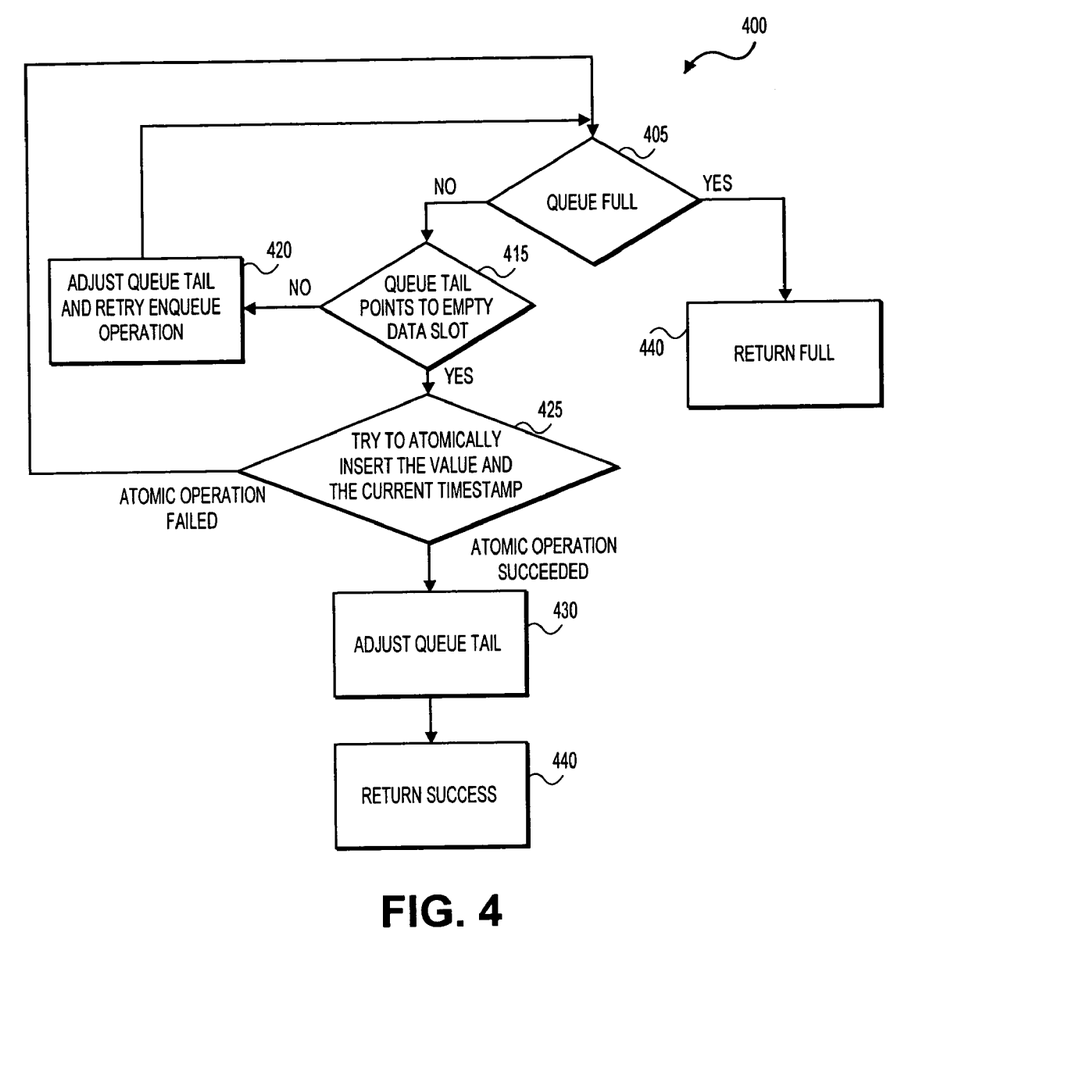
FIG. 4 illustrates a block diagram for an enqueueing process embodiment.

FIG. 4 illustrates a block diagram for an enqueueing process. Process 400 begins at block 405. Block 405 determines whether a bounded FIFO memory structure, such as a queue structure, is full or not. If block 405 determines that the memory structure is full, process 400 continues with block 440 where a status of "full" is returned. If it is determined in block 405 that the memory structure is not full, process 400 continues with block 415. In block 415 it is determined whether a tail portion of the bounded FIFO memory structure points to an address of an empty data location. If it is determined in block 415 that the tail portion is not pointing to an address of an empty data location, process 400 continues with block 420.

In block 420, the tail portion of the FIFO memory structure is adjusted. In one embodiment, the FIFO memory structure tail portion is adjusted by atomically incrementing the tail portion by one using an atomic compare and exchange operation. Process 400 then continues back to block 405 to retry enqueueing process 400. If block 415 determines that the tail portion is pointing to an empty data location (e.g., having the value 0xFFFF), process 400 continues with block 425.

In block 425 the value to be inserted into the tail portion is atomically attempted to be inserted along with updating the location with a current timestamp. If the attempt to insert the value into the tail portion fails, process 400 continues with block 405 for a retry. If the attempt to insert the value into the tail portion is successful, process 400 continues with block 430.

In block 430, the tail portion is adjusted by setting the value of the tail portion to be (tail portion+one). Process 400 continues with block 440 where the status is returned as a success. Process 400 then waits for the next instruction to add a value to the tail portion of the FIFO memory structure.

Figure 5:
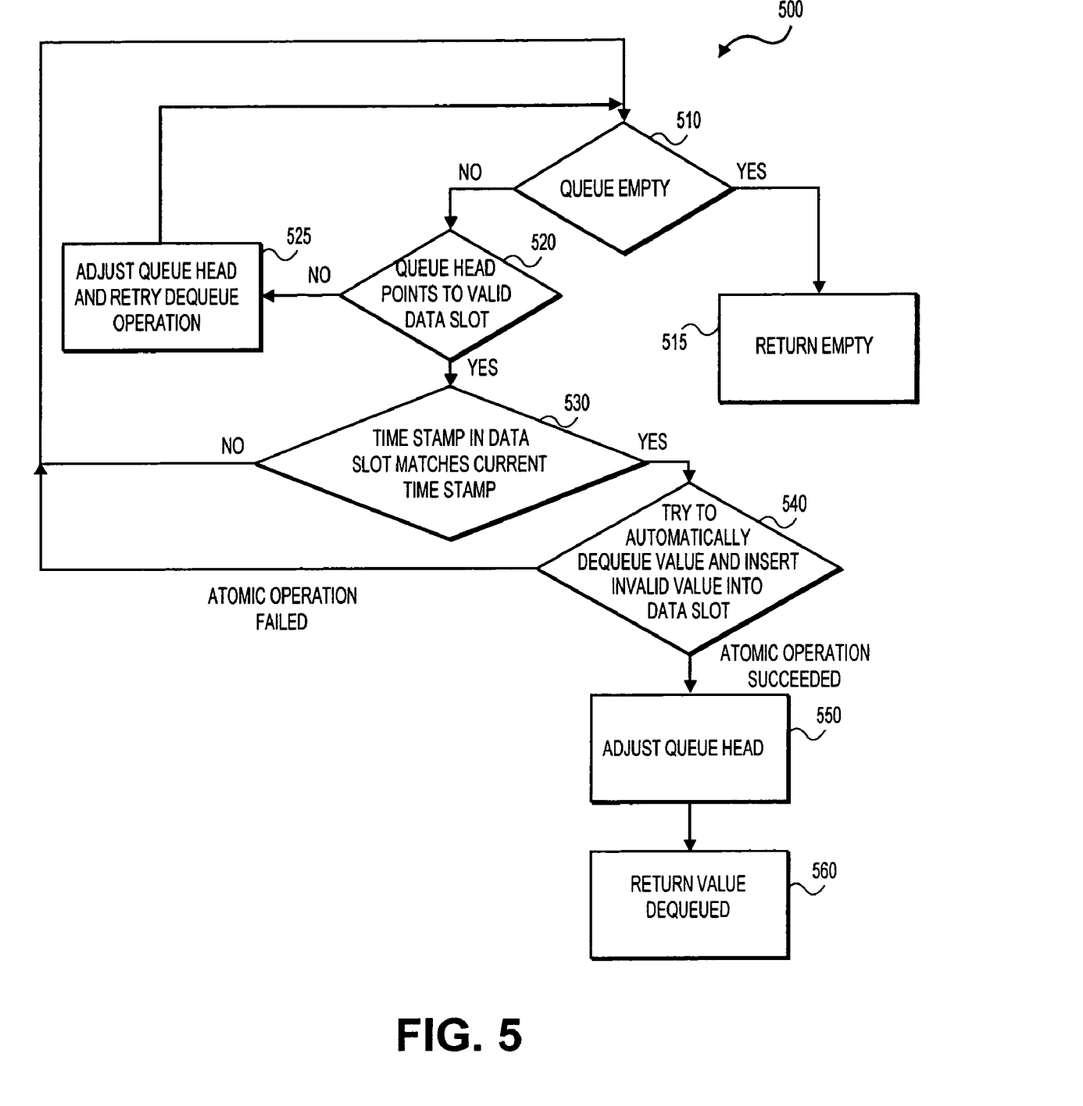
FIG. 5 illustrates a block diagram for a dequeueing process embodiment.

FIG. 5 illustrates a block diagram for a dequeueing process. Process 500 begins with block 510. In block 510 it is determined whether a bounded FIFO memory structure (e.g., a queue memory structure) is empty or not. If block 510 determines that the FIFO memory structure is empty, process 500 continues with block 515. In block 515, status is returned indicating the FIFO memory structure empty. If block 510 determines that the FIFO memory structure is not empty, process 500 continues with block 520.

In block 520 it is determined whether a head portion of the FIFO memory structure points to an address of a valid data location (i.e., not a 0xFFFF value). If block 520 determines that the head portion is not pointing to an address of a valid data location, process 500 continues with block 525. In block 525, the head portion is adjusted by adding one to the position of the FIFO head pointer. That is, the value that was in the head portion is now moved out of the head portion. If block 520 determines that the head portion pointed to is a valid data location, process 500 continues with block 530.

In block 530 it is determined whether the time stamp in the data location of the head portion matches the current time stamp. If block 530 determines that the time stamp in the data location of the head portion does not match the current time stamp, process 500 continues with block 510. If block 530 determines that the time stamp in the data location of the head portion matches the current time stamp, process 500 continues with block 540.

In block 540, the head portion value is attempted to be atomically dequeued and the invalid value (0xFFFF) is attempted to be inserted into the data location of the head portion. If the atomic attempt fails, process 500 continues with block 510. If the atomic attempt succeeds, process 500 continues with block 550. In block 550 the head portion is adjusted by adding one to the FIFO head pointer (i.e., head portion equals head portion +one). Process 500 continues with block 560 where the dequeued value is returned.

Figure 6:
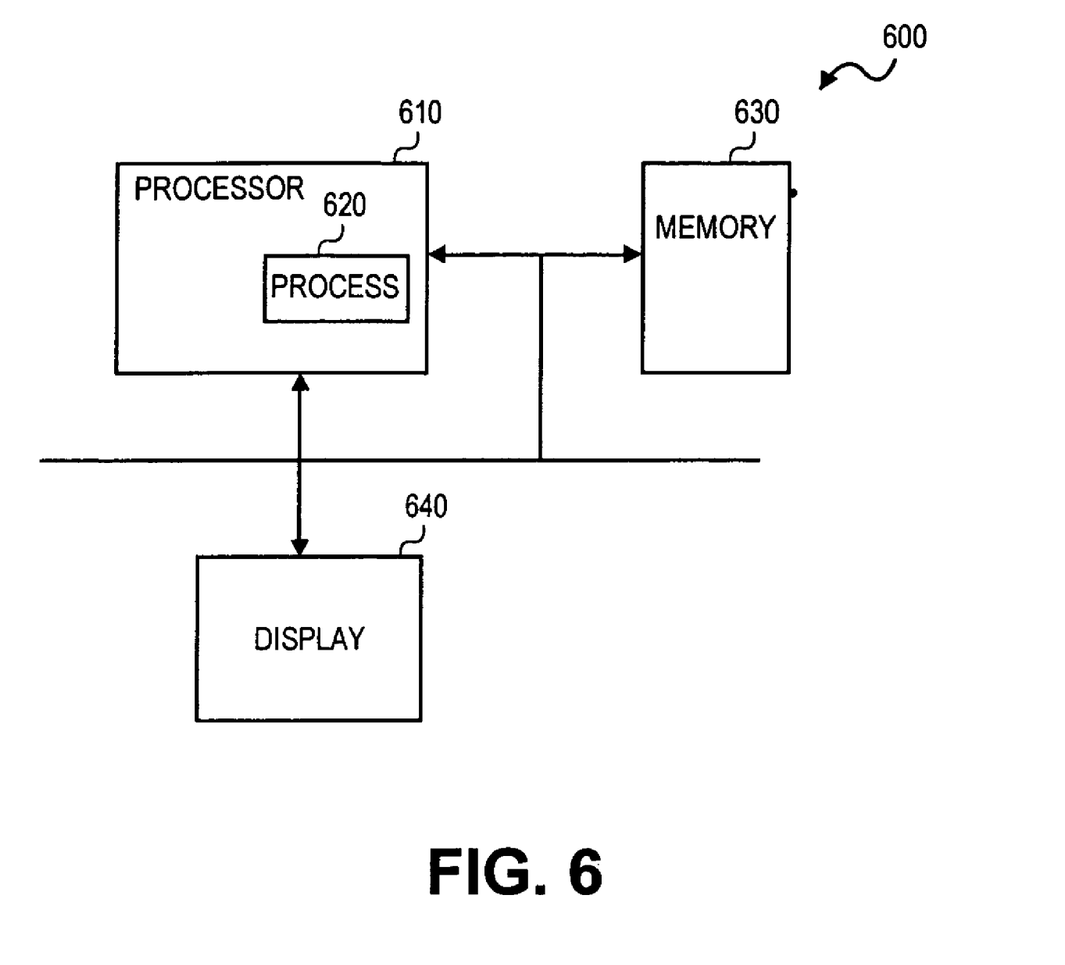
FIG. 6 illustrates a system for an embodiment.

FIG. 6 illustrates system 600. In one embodiment system 600 includes processor 610, size bounded first-in first-out (FIFO) memory 630 connected to processor 610, display 640 connected to processor 610 and managing process 620 to run on processor 610 to manage FIFO memory 630. In one embodiment FIFO memory 630 includes a counter portion and a value portion for each of a tail portion and a head portion. In one embodiment managing process 620 is non-blocking.

In one embodiment, managing process 620 adds a data structure to the tail portion, adds a timestamp to the data structure and adjusts the counter portion of the tail portion if the tail portion is empty. In one embodiment, the counter is adjusted by adding one to the counter. It should be noted that other embodiments can adjust the counter by subtracting or adding other values as well.

In one embodiment managing process 620 removes a data structure from the head portion and inserts an invalid value (i.e., 0xFFFF ) for the head portion if a timestamp associated with the head portion matches a current timestamp. In one embodiment adding a data structure to the head portion and removing another data structure from the tail portion occur concurrently.

In one embodiment the counter portion has a size larger than a size of the value portion. In another embodiment the timestamp tracks order of data structures added to FIFO memory 630. In this embodiment, the order of the data structures is maintained by using timestamps. That is, the earlier a timestamp, the closer a data structure is to the head portion, the later the timestamp, the closer a data structure is to the tail structure (i.e., first-in-first-out).

In one embodiment adding a data structure to FIFO memory 630 and removing another data structure from FIFO memory 630 each include a single compare and swap instruction. In one embodiment a value equal to an address of the tail portion or the head portion modulus a size of FIFO memory 630 is used to index FIFO memory 630.

In one embodiment managing process 620 uses a regular cmpxchg instruction that is available in IA-32, instead of using a DCAS (double compare and swap) instruction, which is not available on IA-32.

In one embodiment, managing process 620 allows both concurrent enqueues and concurrent dequeues without blocking. In one embodiment, managing process 620 does not use any Oracle® algorithms, which are usually linear in the size of the queue, and can be inefficient. In one embodiment managing process 620 manages a bounded queue. It should be noted that with an unbounded queue, the FIFO ordering is established by the linked-list nature of the queue unlike a bounded queue. Using a bounded queue avoids the time cost of memory allocation and deallocation on every enqueue and dequeue operation.

In one embodiment, system 600 allows concurrent non-blocking data structure operations. It should be noted that concurrent non-blocking operations are important to obtain scalable applications on multiple-core architectures. It should also be noted that with a lock-based structure, only a single thread can access a structure at a time, even if simultaneous accesses by multiple threads would have been made for different parts of the same structure. Additionally, if a thread gets preempted inside a critical section, it holds up progress for other threads. With large numbers of threads, a locking mechanism hinders scalability. In the above embodiments, non-blocking concurrent operations on memory structures are not delayed.

The above embodiments can be used in a plurality of applications, such as runtime systems (for thread scheduling) and producer-consumer algorithms. In one embodiment where the above embodiment is used in a thread-scheduling system, there is always an upper bound (for example 1024 threads) on the number of threads that the scheduler needs to maintain at any one time. In another embodiment where the above embodiments are used in producer-consumer algorithms, there is an upper bound on the number of items that can reside in the queue. For example, in packet processing, there is an upper bound on the number of unprocessed packets, after which the network starts dropping them.

In embodiment uses where there is an upper bound, it is inefficient to use an unbounded queue because every enqueue operation takes time for memory allocation; and a dequeue operation has to incur time delay for freeing memory. It should be noted that memory allocation operation implementation may not scale to a large number of hardware threads (especially when a consumer de-allocates memory allocated by the producer, which requires that the producer and consumer concurrently access a shared memory buffer).

The above-embodiments having non blocking mechanisms are inherently more scalable and have increased performance when there are a plurality of threads. These embodiments avoid problems inherent in locked mechanisms, such as priority inversion, deadlock, and convoying.

In one embodiment an array is used for implementing a FIFO memory structure (e.g., queue) in a non-blocking manner. A non-blocking mechanism provides preemption safety, deadlock safety, etc., which is important in a multiple-core architecture. In this embodiment, by using an array no loss of time for memory allocation and deallocation is lost during queue operations. Additionally, this embodiment does not need to rely on a scalable memory allocation-free package.

Some embodiments can also be stored on a device or machine-readable medium and be read by a machine to perform instructions. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Some embodiments can also be stored on a device or machine-readable medium and be read by a machine to perform instructions. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; and flash memory devices. The device or machine-readable medium may include a micro-electromechanical system (MEMS), nano-technology devices, organic, holographic, solid-state memory device and/or a rotating magnetic or optical disk. The device or machine-readable medium may be distributed when partitions of instructions have been separated into different machines, such as across an interconnection of computers or as different virtual machines.

What is claimed is:

1. A machine-accessible medium containing instructions that, when executed, cause a machine to:
   perform a managing process to manage a size bounded first-in first-out (FIFO) memory structure having a head portion and a tail portion, the memory structure to store a plurality of data structures, said managing process including instructions for:
   adding a data structure to the tail portion, adjusting a counter portion of the tail portion if the tail portion is empty and using the counter portion as a timestamp to maintain FIFO order,
   removing a data structure from the head portion and inserting an invalid value for the head portion if a timestamp associated with the head portion matches a current timestamp, wherein the data structure includes the counter portion and a value portion, and said managing process is non-blocking.

2. The machine-accessible medium of claim 1, wherein the adding and the removing occur concurrently.

3. The machine-accessible medium of claim 1, wherein the counter portion has a size equal to three times a size of the value portion.

4. The machine-accessible medium of claim 1, wherein an order of data structures added to the memory structure is tracked by the timestamp.

5. The machine-accessible medium of claim 1, wherein the adding and the removing each include a single compare and swap instruction.

6. The machine-accessible medium of claim 1, wherein a value equal to an address of one of the tail portion and the head portion, modulus a size of the FIFO memory structure to index the FIFO memory structure.

7. A machine-accessible medium containing instructions that, when executed, cause a machine to:
   perform a queue managing process to manage a size bounded first-in first-out (FIFO) memory structure having a head portion and a tail portion, the memory structure to store a plurality of data structures, said managing process including instructions for:
   enqueueing a data structure, adjusting a counter portion of the tail portion if the tail portion is empty and using the counter portion as a timestamp to maintain FIFO order,
   dequeueing a data structure from the head portion and inserting an invalid value for the head portion if a timestamp associated with the head portion matches a current timestamp, wherein said queue managing process is non-blocking.

8. The machine-accessible medium of claim 7, wherein the enqueueing and the dequeueing occur concurrently.

9. The machine-accessible medium of claim 7, wherein the data structure having a timestamp portion and a value portion, the timestamp portion having a size equal to three times a size of the value portion.

10. The machine-accessible medium of claim 7, wherein an order of data structures added to the queue is tracked by the timestamp.

11. The machine-accessible medium of claim 7, wherein the enqueueing and the dequeueing each include a single compare and swap instruction.

12. The machine-accessible medium of claim 7, wherein a value equal to an address of one of the tail portion and the head portion, modulus a size of the FIFO memory structure to index the FIFO memory structure.

13. A system comprising:
   a processor;
   a size bounded first-in first-out (FIFO) memory coupled to the processor;
   a display coupled to the processor;
   a managing process to run on the processor to manage the FIFO memory structure;
   wherein the FIFO memory includes a counter portion and a value portion for each of a tail portion and a head portion, said managing process is non-blocking, and the counter portion is used as a timestamp to maintain FIFO order.

14. The system of claim 13, wherein the managing process operates to add a data structure to the tail portion, and to adjust a counter portion of the tail portion if the tail portion is empty.

15. The system of claim 13, wherein the managing process is to remove a data structure from the head portion and insert an invalid value for the head portion if a timestamp associated with the head portion matches a current timestamp.

16. The system of claim 13, wherein adding a data structure to the head portion and removing another data structure from the tail portion occur concurrently.

17. The system of claim 13, wherein the counter portion has a size larger than a size of the value portion.

18. The system of claim 13, wherein the timestamp tracks an order of data structures added to the FIFO memory.

19. The system of claim 13, wherein a value equal to an address of a size of the FIFO memory modulus one of the tail portion and the head portion to index the FIFO memory.

20. A machine implemented method comprising:
   adding a data structure to a tail portion of a first-in-first-out (FIFO) memory structure,
   adjusting a counter portion of the tail portion if the tail portion is empty and using the counter portion as a timestamp to maintain FIFO order,
   removing a data structure from a head portion of the FIFO and inserting an invalid value for the head portion if a timestamp associated with the head portion matches a current timestamp,
   wherein the data structure includes the counter portion and a value portion.

21. The machine implemented method of claim 20, wherein the adding and the removing occur concurrently.

22. The machine implemented method of claim 20, wherein an order of data structures added to the memory structure is tracked by the timestamp.

* * * * *